United States Patent [19]

Goans

[11] 4,372,333

[45] Feb. 8, 1983

[54] VALVE ACTUATING APPARATUS AND METHOD

[75] Inventor: Kip B. Goans, Harvey, La.

[73] Assignee: Baker CAC, Inc., Belle Chasse, La.

[21] Appl. No.: 295,203

[22] Filed: Aug. 24, 1981

[51] Int. Cl.³ .................. F17D 3/00; F16K 31/122
[52] U.S. Cl. .................................. 137/1; 74/531;
92/23; 251/63.4; 251/63.6; 251/77; 251/297
[58] Field of Search ............... 137/1; 251/63.4, 63.6,
251/77, 297; 74/527, 531, 569; 92/23, 130 A

[56] References Cited

U.S. PATENT DOCUMENTS

| | | | |
|---|---|---|---|
| 1,710,055 | 4/1929 | Grant | 251/63.4 |
| 2,733,729 | 2/1956 | Wolfe | 251/297 |
| 3,040,772 | 6/1962 | Todd | 251/297 |
| 3,429,550 | 2/1969 | Grove | 251/297 |
| 3,737,603 | 6/1973 | Kish et al. | 251/63.4 |
| 3,986,701 | 10/1976 | Hopkins | 74/527 |
| 4,073,466 | 2/1978 | Snyder | 251/63.4 |
| 4,309,022 | 1/1982 | Reinicke et al. | 251/63.4 |
| 4,342,335 | 8/1982 | Reinicke et al. | 74/531 |

FOREIGN PATENT DOCUMENTS 51313 12/1919 Sweden ................... 92/23

*Primary Examiner*—George L. Walton
*Attorney, Agent, or Firm*—William C. Norvell, Jr.

[57] ABSTRACT

A fluid pressure actuator is moved in one direction by fluid pressure and returned in the other direction by a compressed spring. With the method and apparatus embodied in the disclosure, a plurality of additional energy storage storing devices are compressed by only the initial movement of the actuator in response to the application of fluid pressure thereto. Such energy is applied to the energy storage devices by an annular cam surface provided on the actuator shaft. During the return movement of the actuator, the stored energy is returned in the form of an additional axial force applied to the actuator shaft just prior to its return to its original position. When such actuator is applied to a valve, the additional force imparted to the shaft by the energy storing devices may be designed to cause the severing of a wire line trapped in the opening of the valve at the instant that closing of the valve is required.

16 Claims, 3 Drawing Figures

VALVE ACTUATING APPARATUS AND METHOD

BACKGROUND OF THE INVENTION

1. Field of the Invention

The invention relates to a fluid pressure actuator for valves, which are opened through the application of fluid pressure, but closed by the relaxation of compressed springs, and which require a maximum force to be exerted at the end of the valve closing movement in order to effect the severing of any wire line or similar obstruction that may remain in the valve opening.

2. Description of the Prior Art

Many valves are of the type that are actuated to their open position through the application of a control fluid pressure. The opening movement of the valve under the influence of such fluid pressure compresses one or more springs which are employed to assist in the return the valve to its closed position. This particular arrangement is desirable because of the fact that any failure of equipment in the well, or any other accidental occurrence which requires that the valve be closed, could very well affect the fluid pressure line transmitting control fluid pressure to the valve. Therefore, it is desirable that the energy required to effect the closing of the valve be stored in the valve and be independent of any control lines.

When such accidents or failures occur, it may often happen that a wire line, for example, from which a well tool may be suspended, is traversing the opening of the valve. It is very important to the protection of the well and the personnel at the well head, that the closing of the safety valve be accomplished with sufficient force to effect a severing of such wire line. This necessarily requires that a substantial force be exerted by the compressed springs at the end of their closing stroke, and, due to the known characteristics of springs, it necessarily means that excessive fluid pressure forces would be required to compress such springs during the movement of the valve from its closed to its fully open position. What is required is an actuating system wherein the energy for effecting the final closure of the safety valve is stored in a suitable mechanism within the valve only during the initial opening movements of the valve and is then not released until the valve approaches its closed position.

SUMMARY OF THE INVENTION

The invention provides an improved method and apparatus for operating valves wherein the closing of the valve is effected by compressed springs and the energy required to effect the final closing of the valve is substantially greater than that required to move just the valve elements to a closed position.

In accordance with this invention, a unidirectional fluid pressure actuator is provided having a shaft which is connected to the movable element of a valve by a lost motion connection. Conventional helical springs or the like oppose the opening movement of the actuator shaft and effect the storage of sufficient energy to return the operating element of the valve to its closed position under normal conditions. To provide an additional closing thrust to the actuator shaft as its approaches the fully closed position of the valve, this invention provides a plurality of energy storing devices which are generally radially disposed with respect to the actuator shaft and are energized to an energy storing condition by a cam surface carried by the actuator shaft. Such cam surface operates on the energy storage devices only during the initial movement of the shaft in a valve opening direction. A lost motion connection between the actuator shaft and the valve operating element permits such energy storage to be accomplished prior to effecting any opening movement of the valve, thus reducing the amount of fluid pressure force required during the energy storage step.

The energy storage devices may comprise an ordinary helical spring, a stack of Belleville springs, an elastomeric mass, a piston cooperating with a cylinder containing a trapped compressible fluid, or any combination of the aforementioned energy storing devices.

As the actuator shaft returns the valve to the closed position under the influence of the conventional axially disposed springs, the energy stored in the energy storing devices is released in the form of an additional axial thrust on the actuator shaft toward the fully closed position. Such thrust is imparted by the cooperation of the energy storage devices with the same cam surface that effected the storage of energy therein.

DESCRIPTION OF THE PREFERRED EMBODIMENTS

Figure 1:
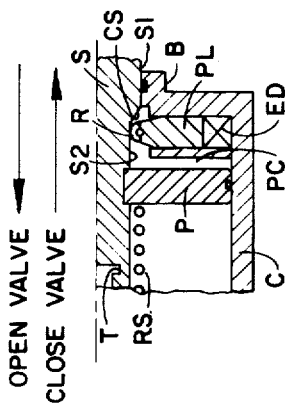
FIG. 1 is a schematic sectional view illustrating the basic method and apparatus for a valve actuator incorporating this invention.

FIG. 1 is a schematic diagram illustrating the basic construction and method of operating of a valve actuator embodying this invention. A cylinder C defines a fluid pressure chamber PC in which a piston P is mounted for sliding, sealable movement relative to the bore surface of cylinder C. A conventional return spring RS opposes pressure produced movement of piston P. Piston P is suitably secured to a shaft S which in turn is secured by a T slot T to the operating element of a valve, such as a safety valve for an oil well. A large diameter portion S1 of shaft S is mounted for sliding sealing movement in a bearing B defined in one end wall of the cylinder C. A smaller diameter portion S2 of shaft S is connected to the larger diameter portion by an annular cam surface CS. One or more generally radially disposed plungers PL having roller R on the end thereof engage the outer surface of the shaft S.

In FIG. 1, the shaft S is illustrated as being in the position corresponding to the closed position of the valve element that it is intended to operate. When fluid pressure is applied to the pressure chamber PC, it acts on the piston P to move the shaft S to the left toward its valve open position. In the initial movement of the shaft S, the cam surface CS engages the roller R and forces the plunger PL radially outwardly. This radial outward movement is utilized to store energy in a compressible energy storing device ED. Typical of such devices is an ordinary helical spring, a stack of disc spring washers, an elastomeric mass, or a compressible fluid that is trapped between the outer end of the plunger PL and the surrounding portions of the cylinder C to effect a compression of the trapped compressible fluid.

Thus, in the initial movement of the shaft S in a valve opening direction, the primary resisting force is that required to effect a compression of the energy storing device ED. After the plunger roller R rides up the cam surface CS to rest on the large diameter portion S1 of the shaft S, no additional energy is required for the energy storing device, and all of the fluid pressure derived energy applied to the piston P may be utilized to effect the opening of the valve and the compression of the conventional valve return spring RS.

When it is desired to close the valve, the fluid pressure is exhausted from the pressure chamber PC and the piston P and the shaft S are moved toward the right to their valve closing position by the compressed return spring RS. When, however, the cam surface CS reaches a point of alignment with the roller R of the plunger PL, the stored energy in the energy storage device ED is released in the form of a substantial additional axial thrust imparted to the shaft S in the valve closing direction. Due to the mechanical advantage of the inclined cam surface, it is readily apparent that a substantial additional axial force may be applied to the shaft S during the last stages of its travel to a valve closing position. Thus, sufficient force may be readily generated to effect the severing of a wire line or other form of obstruction that may be traversing the valve opening at the time that it is required to close the valve. The ability to apply such additional force only during the final stages of the closing movement of the valve is of inestimatable value in improving the dependable operation of safety valves for wells.

Figure 3:
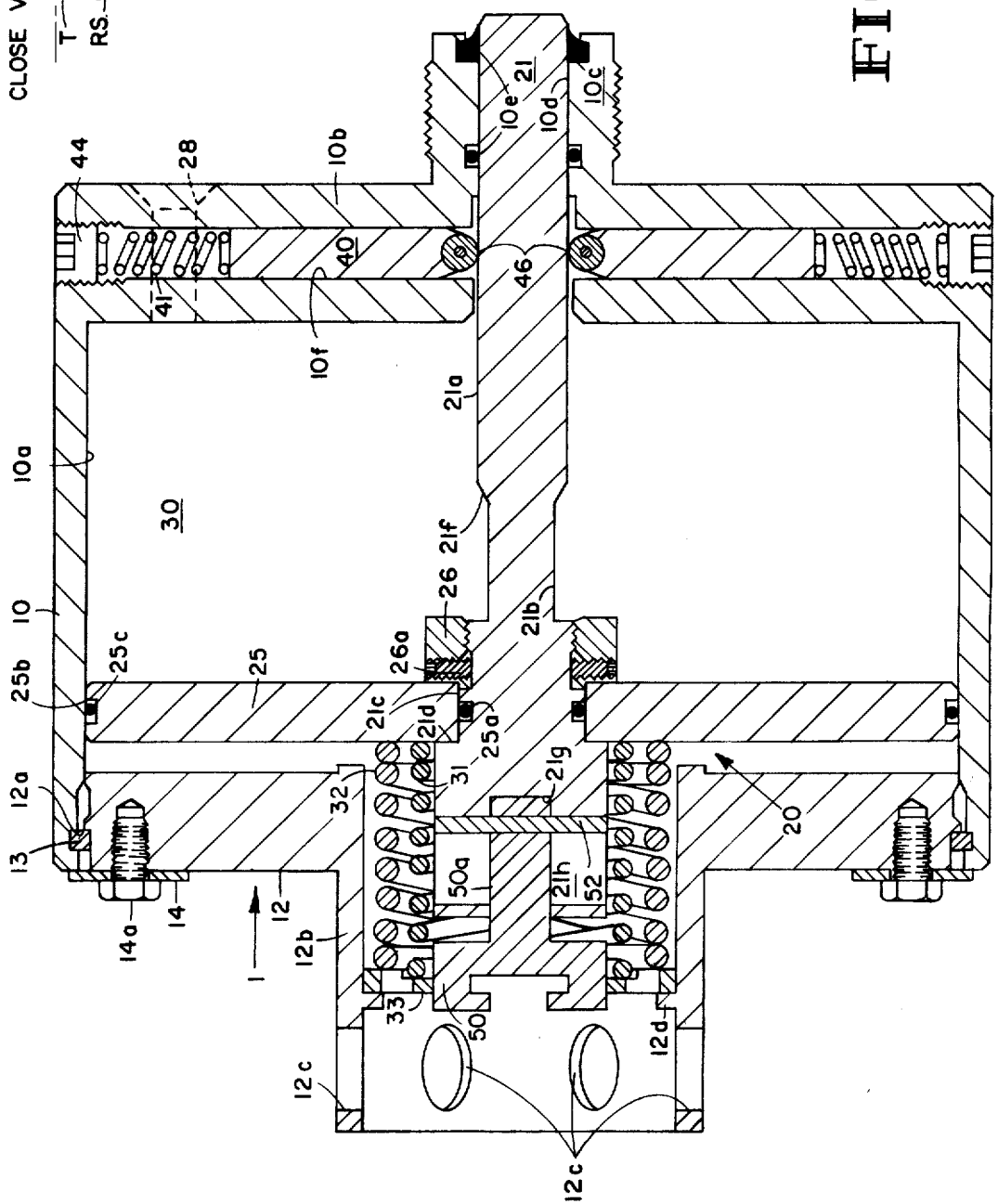
FIG. 3 is a view similar to FIG. 2 but showing the elements of the valve in the valve opened position.
Figure 2:
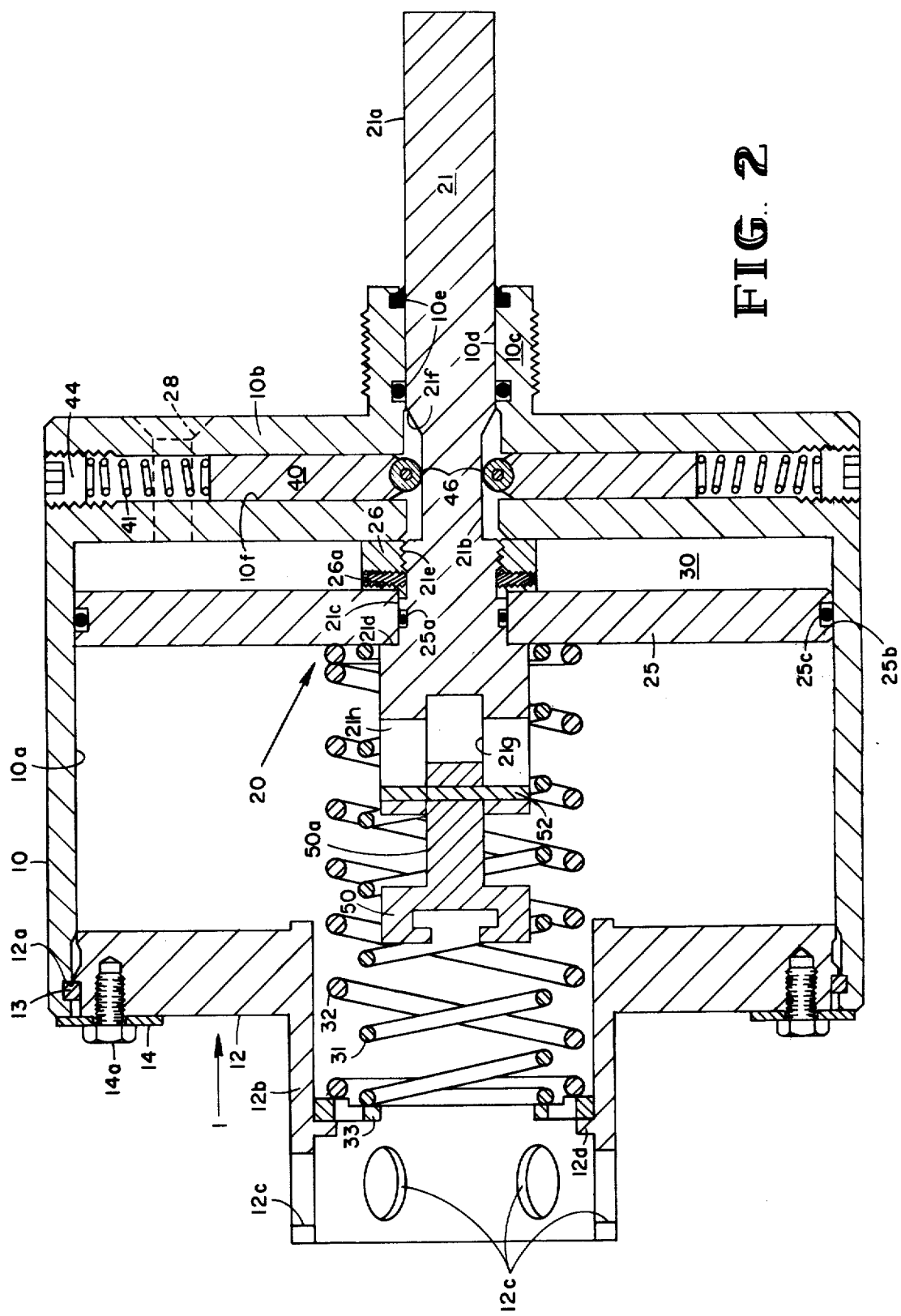
FIG. 2 is a vertical sectional view of a fluid pressure actuator incorporating this invention, with the elements thereof shown in their valve closed position.

Referring now to FIGS. 2 and 3 there is shown in detail the actual construction of a valve actuator 1 embodying this invention. Valve actuator 1 comprises a hollow body portion 10 having an annular mounting element 12 suitably secured to one end thereof. Securement of element 12 may be effected by a C-ring 13 which is mounted in a suitable groove in the interior bore surface 10a of the hollow body member 10. Ring 13 abuts an external radial shoulder 12a provided on the mounting element 12. A clamping ring 14 overlaps the end face of the mounting member 12 and the end face of the hollow body member 10 and is secured thereto by a plurality of peripherally spaced bolts 14a.

Annular mounting member 12 is additionally provided with an axially extending, relatively small diameter flange 12b which is conventionally secured to the bonnet (not shown) of a housing of a valve to be operated, such as a safety valve for an oil well. Such securement may be effected by a plurality of bolts (not shown) passing respectively through a plurality of peripherally spaced radial holes 12c provided in the extension 12b.

The other end of body member 10 is provided with a relatively thick annular end wall 10b which, at its inner end, has an axially extending annular bearing portion 10c formed thereon. Bearing portion 10c defines a bore 10d for slidably receiving the shaft portion 21 of a piston assemblage 20. Suitable seals 10e are provided in annular extension 10c for effecting a slidable and sealable engagement of the bore bearing portion 10c with the shaft portion 21.

An annular piston element 25 is assembled to a medial portion of the shaft 21 that lies within the hollow bore 10a of the body housing 10. While the piston element 25 may be secured to the shaft 21 in a variety of manners, it is illustrated as being snugly engaged with a cylindrical surface 21c formed on the piston shaft 21 and abutting a radial shoulder 21d. A retaining ring 26 is threaded onto threads 21e formed on the piston shaft 21 and locked in snug engagement with adjacent face of the piston element 25 by set screws 26a.

A seal 25a prevents fluid leakage between the annular piston element 25 and the shaft 21. The outer surface of piston element 25 is provided with a peripheral groove 25b which mounts a seal 25c which engages the interior bore 10a of the cylinder body 10. Thus, a fluid pressure chamber 30 is defined between the thickened end wall 10b of the hollow body 1 and the adjacent face of the annular piston element 25. Pressured fluid may be supplied to such pressure chamber 30 through one or more inlet ports 28 which are formed in the thickened end wall 10b of the body housing 10.

Thus, the application of fluid pressure to pressure chamber 30 will effect a movement of the piston element 25 and the piston shaft 21 from the valve closed position, illustrated in FIG. 2, to the left to the valve open position illustrated in FIG. 3. Such movement of the piston assemblage 20 is opposed by a pair of concentric helical springs 31 and 32 which engage the left hand face of the piston element 25 and abut a spring seat ring 33 which is mounted against an internally projecting shoulder 12d provided in the end of the annular flange extension 12b of the mounting element 12. Springs 31 and 32 are thus compressed by the fluid pressure induced movement of the piston shaft 21 toward its valve opening position, and, when fluid pressure is released from chamber 30, the piston element 25 and the connected piston assemblage 20 will be moved to the right from the position shown in FIG. 3 toward the closed position of the valve shown in FIG. 2.

A plurality of generally radially disposed energy storing devices are provided in the thickened end wall 10b of the body housing 10. Such energy storing devices comprise a plurality of plungers 40 mounted in slidable relationship in radial holes 10f provided in the thickened body end wall 10b. Each plunger is backed up by a compressible energy storing device, here shown as a simple helical spring 41, but it should be understood that a stack of disc springs could be employed or a compressible column of elastomeric material, or, through the addition of appropriate sealing rings to the plungers 40, a compressible fluid, such as a gas could be utilized either alone or in combination with the springs as an energy storing device. The springs 41 are respectively backed by sealing plugs 44 which are respectively threadably secured in the ends of the radial holes 10f. The inner ends of plungers 40 each mount a roller 46 which rides upon the adjacent exterior surface of the shaft 21. Shaft 21 is provided with an axially extending cylindrical surface 21b which connects with the normal bearing diameter portion 21a of shaft 21 through an abrupt outwardly inclined annular camming surface 21f. In the closed position of the valve actuator illustrated in FIG. 2, the plunger rollers 46 are resting against the reduced diameter cylindrical surface 21b.

When fluid pressure is introduced into the pressure chamber 30 to effect the movement of the piston assemblage 20 to the left, the energy storage devices have no significant effect on such movement until the inclined cam surface 21f contacts the rollers 46. Then at this point, a substantial amount of energy is required to concurrently force all of the plungers 40 outwardly and thus store energy in the energy storing springs 41. Once the cam rollers 46 ride up on the bearing diameter portion 21a of the shaft 21, then no significant energy will be absorbed from the opening movement of the shaft assemblage 20 by the plungers 40 and their associated energy storing devices 41.

On the return movement of the shaft assembly 20 from the open position, shown in FIG. 3, back to the closed position shown in FIG. 2, a significant additional axial thrust is imparted to the piston shaft assemblage 20 through the cooperation of the plungers 40 with the inclined annular cam surface 21f. In this case, the plunger rollers 46 ride down such surface under the forces imposed thereon by the energy storing devices 41 and drive the piston shaft 21 to the right, to the fully closed position of the valve being actuated, with a substantial additional impetus. In fact, by utilization of a sufficient number of plungers 40 and associated energy storing devices 41, the additional axial force imparted to the piston shaft 21 can effect the severing of a wire line that may be traversing the opening of a safety valve at the time that it is desired to effect a complete closure of such safety valve.

To further reduce the energy requirements involved in the opening movements of an actuator embodying this invention, a lost motion connection is preferably employed between the piston shaft 21 and the shiftable valve element (not shown) of the safety valve or other type of valve which is to be operated by the actuator. Such lost motion connection may conveniently comprise an annular connector 50 which has a reduced diameter 50a slidably mounted in an appropriate recess 21g formed in the end of the shaft 21. A pin and slot connection is then provided between the cooperating slidable portions of the piston shaft 21 and the connector 50. Obviously, either one of the mentioned elements may be provided with an axially extending slot and the other with a radial pin cooperating with the slot. In the construction illustrated in the drawings, an axially extending slot 21h is formed in the end of piston shaft 21 and a radially extending pin 52 is mounted in the reduced diameter end of the connector 50 and slidably cooperates with the slot 21h.

With this arrangement, the initial movement of the piston shaft 21 to the point where the energy storing devices 41 are fully compressed is accomplished within the limits of the lost motion connection so that no force is required to be applied to opening the valve until after all of the energy storing devices 41 have been compressed. This reduces the total amount of fluid pressure force required and permits either the design of the actuator to a smaller overall diameter, or the utilization of a lower fluid pressure force to effect the opening movements of the valve.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In a fluid pressure actuator for moving a cooperating member, said actuator having cooperating piston and cylinder means for moving a shaft in one direction for a fixed distance from a starting position and means for moving the shaft in the opposite direction to its starting position, the improvement comprising: an axially extending cam surface on said shaft, said cam surface having a small radius portion connected to a larger radius portion by an inclined cam surface; a generally radially disposed plunger engaging said small radius portion of said cam surface in said starting position; energy storing means opposing radially outward movement of said plunger; said inclined cam surface being engaged by said plunger at the beginning of the fluid pressure stroke to move the plunger outwardly and store energy in said energy storing means prior to actuation of said cooperating member, whereby said stored energy imparts an increased axial thrust force to said shaft at the end of its return stroke to said starting position.

2. The improvement of claim 1 wherein said plunger has a roller engaging said cam surface on said shaft.

3. In a fluid pressure actuator for moving a cooperating member, said actuator having cooperating piston and cylinder means for moving a shaft in one direction for a fixed distance from a starting position and means for moving the shaft in the opposite direction to its starting position, the improvement comprising: an axially extending annular cam surface on said shaft, said annular cam surface having a small diameter portion connected to a larger diameter portion by an inclined annular cam surface; a plurality of generally radially disposed plungers engaging said small diameter portion of said annular cam surface in said starting position; said inclined annular cam surface being engaged by said plungers at the beginning of the fluid pressure stroke to compress the plunger and store energy therein prior to actuation of said cooperating member, whereby said stored energy imparts an increased axial thrust force to said shaft at the end of its return stroke to said starting position.

4. The improvement of claim 3 wherein each plunger has a roller engaging said annular cam surface on said shaft.

5. A fluid pressure actuator for a valve having a linearly movable valve opening and closing member, said actuator comprising: cooperating piston and cylinder means for moving a shaft in one direction from a starting position; spring means for moving the shaft in the opposite direction to its starting position; means for connecting said shaft to the valve opening and closing member, whereby the fluid pressure produced movement of the shaft opens the valve and the spring produced return movement of the shaft closes the valve; an axially extending cam surface on said shaft, said cam surface having a small radius portion connected to a larger radius portion by an abruptly inclined cam surface; a generally radially disposed spring pressed plunger engaging said small radius portion of said cam surface in said starting position; said abruptly inclined cam surface being engaged by said spring pressed plunger at the beginning of the fluid pressure stroke to compress the plunger spring and store energy therein prior to actuation of said valve member, whereby said stored energy imparts an increased axial thrust force to said shaft at the end of its return stroke to said starting position.

6. A fluid pressure actuator for a valve having a linearly movable valve opening and closing member, said actuator comprising: cooperating piston and cylinder means for moving a shaft in one direction from a starting position and spring means for moving the shaft in the opposite direction to its starting position; means for connecting said shaft to the valve opening and closing member, whereby the fluid pressure produced movement of the shaft opens the valve and the spring produced return movement of the shaft closes the valve; an axially extending annular cam surface on said shaft, said annular cam surface having a smaller diameter portion connected to a larger diameter portion by an inclined annular cam surface; a plurality of generally radially disposed spring loaded plungers engaging said smaller diameter portion of said cam surface in said starting position; said inclined annular cam surface being engaged by said spring pressed plungers at the beginning of the fluid pressure stroke to compress the plunger springs and store energy therein prior to actuation of said valve member, whereby said stored energy imparts an increased axial thrust force to said shaft at the end of its return stroke to said starting position.

7. The apparatus of claim 5 or 6 wherein said means for connecting said shaft to the movable valve element comprises a lost motion connection permitting initial fluid pressure produced movement of said shaft to store energy in each plunger prior to initiating opening movement of the valve.

8. The apparatus of claim 5 or 6 wherein said means for connecting said shaft to the movable valve element comprises a connector link axially slidably on an end of said shaft, and a pin and slot connection between said connector link and said shaft permitting initial fluid pressure produced movement of said shaft to store energy in each spring pressed plunger prior to initiating opening movement of the valve.

9. A fluid actuator for a valve having a moveable element requiring a closing force sufficient to shear a wire line traversing the valve opening, comprising: a hollow body defining a fluid pressure cylinder and a shaft bearing concentric with said cylinder; a piston assembly having a shaft slidably sealably mounted in said shaft bearing; a radially enlarged shoulder carried by said shaft and having an outer peripheral surface slidably and sealingly engaging the bore of said fluid pressure cylinder; means for connecting said shaft to the movable element of the valve; port means for supplying fluid pressure to one radial face of said shoulder to move said shaft in the valve opening direction; resilient means in said body opposing the movement of said shaft in said valve opening direction; an annular cam surface on said shaft; and a plurality of generally radially disposed spring loaded plungers engaging said cam surface, said annular cam surface having an inwardly inclined portion engaged by said plungers just prior to said shaft reaching the axial position corresponding to the closed position of the valve, said spring loaded plungers being constructed to impart an increased axial closing force to said shaft prior to actuation of said moveable element sufficient to shear a wire line traversing the valve opening.

10. The apparatus of claim 9 wherein each spring loaded plunger has a roller engagement with said annular cam surface.

11. The apparatus of claim 9 wherein said means for connecting said shaft to the movable valve element comprises a lost motion connection permitting initial fluid pressure produced movement of said shaft to store energy in each spring loaded plunger prior to initiating opening movement of the valve.

12. The apparatus of claim 9 wherein said means for connecting said shaft to the movable valve element comprises a connector link axially slidable on an end of said shaft, and a pin and slot connection between said connector link and said shaft permitting initial fluid pressure produced movement of said shaft to store energy in each spring pressed plunger prior to initiating opening movement of the valve.

13. The method of operating a fluid pressure actuator for moving a cooperating member, said actuator being of the type wherein fluid pressure moves a shaft of the actuator in one direction and an axially disposed bias member returns the shaft in the opposite direction to its starting position comprising the steps of:

(1) applying fluid pressure to initiate movement of the actuator shaft;

(2) during the initial fluid pressure induced movement of the actuator shaft, exerting a force on a generally radially disposed energy storing element through the cooperation of a plunger disposed between the energy storing element and a cam surface on said shaft prior to actuation of said cooperating member, thereby storing energy in said energy storing element during the initial portion of the fluid pressure induced stroke of the shaft; and (3) releasing said fluid pressure and permitting the shaft to return to its starting position under the force of the axially disposed springs until said plunger engages said cam surface and releases the stored energy in the energy storing element by imparting an axial thrust to the final portions of the return stroke of the shaft.

14. The method of operating a valve of the type that is moved to an open position by fluid pressure and returned to a closed position by spring pressure, said valve having a linearly movable actuating element, comprising the steps of:

(1) providing a lost motion connection between a unidirectional fluid pressure actuator and the valve operating member so that initial movement of the actuator in a valve opening direction does not effect movement of the valve operating element;

(2) during said initial movement, storing energy in an energy storing element through the cooperation of a cam surface on the actuator with the energy storing element; and (3) converting said stored energy into an axial thrust on the actuator shaft during the return movement of the actuator shaft to a valve closing position, thereby exerting a maximum closing force on the valve just prior to the valve reaching a fully closed position.

15. The method of claim 13 or 14 wherein said energy storing element comprises a compression spring.

16. The method of claim 13 or 14 wherein said energy storing element comprises a piston and cylinder containing a trapped compressible fluid.

* * * * *